United States Patent [19]
Davison et al.

[11] 3,975,460
[45] Aug. 17, 1976

[54] BLENDS OF CERTAIN HYDROGENATED BLOCK COPOLYMERS WITH ABS POLYMERS

[75] Inventors: Sol Davison; Michael Wales, both of Houston, Tex.

[73] Assignee: Shell Oil Company, Houston, Tex.

[22] Filed: Apr. 24, 1975

[21] Appl. No.: 571,348

Related U.S. Application Data

[63] Continuation-in-part of Ser. No. 300,930, Oct. 26, 1972, abandoned.

[52] U.S. Cl............................ 260/876 B; 260/880 B
[51] Int. Cl.$^2$.................... C08L 51/00; C08L 53/00
[58] Field of Search ............. 260/876 B, 876 R, 880

[56]  References Cited
UNITED STATES PATENTS

| | | | |
|---|---|---|---|
| 3,442,981 | 5/1969 | Stafford et al. ................. | 260/876 B |
| 3,682,768 | 8/1972 | Adams et al. .................... | 260/876 B |
| 3,686,365 | 8/1972 | Sequeira.......................... | 260/876 B |

FOREIGN PATENTS OR APPLICATIONS

| | | | |
|---|---|---|---|
| 1,053,596 | 1/1967 | United Kingdom............. | 260/876 B |
| 1,120,404 | 7/1968 | United Kingdom............. | 260/876 B |

Primary Examiner—Richard B. Turer

[57] ABSTRACT

Polymeric blends having improved processability and high tensile strength comprise a combination of certain selectively hydrogenated block copolymers and ABS polymers.

5 Claims, No Drawings

BLENDS OF CERTAIN HYDROGENATED BLOCK COPOLYMERS WITH ABS POLYMERS

This is a continuation-in-part of application Ser. No. 300,930, filed October 26, 1972 now abandoned.

BACKGROUND OF THE INVENTION

Block copolymers have been developed rapidly within the recent past, the starting monomers usually being monoalkenyl arenes such as styrene or alpha methyl styrene block polymerized with conjugated dienes such as butadiene and isoprene. A typical block copolymer of this type is represented by the structure polystyrene-polybutadiene-polystyrene. When the monoalkenyl arene blocks comprise less than about 55% by weight of the block copolymer, the product is essentially elastomeric. Moreover, due to their peculiar set of physical properties they can be referred to more properly as thermoplastic elastomers. By this is meant polymers which in the melt state are processable in ordinary thermoplastic processing equipment but in the solid state behave like chemically vulcanized rubber without chemical vulcanization having been effected. Polymers of this type are highly useful in that the vulcanization step is eliminated and, contrary to scrap from vulcanized rubbers, the scrap from the processing of thermoplastic elastomers can be recycled for further use.

When the proportion of monoalkenyl arenes is increased beyond about 55 wt % of the polymer up to about 90% by weight of the polymer, the resulting product resembles a high impact thermoplastic material. Those block polymers which comprise in part conjugated diene polymer blocks have one substantial shortcoming, namely, their susceptibility to oxidation or ozonolysis. Substantial improvements both in stability and compatibility with alpha-olefin polymers have been made by hydrogenation of such block polymers. The hydrogenation may be non-selective, selective or complete. Certain technical advantages have been found for selective hydrogenation wherein at least about 80% of the aliphatic double bonds are reduced and no more than about 25% of the aromatic double bonds are reduced by hydrogenation.

While these selectively hydrogenated block copolymers have improved stability over their unsaturated precursors, they have certain shortcomings which it would be desirable to eliminate or minimize. Chief among these is lessened processability. It is possible, of course, to improve processability by diluting the polymer with extending oils and the like. This normally results in a reduction in other physical properties, particularly tensile strength and properties associated therewith.

It is an object of the present invention to improve block copolymer compositions. It is a further object of the invention to provide such compositions which have a substantially improved processability and high tensile strength as well as other associated physical properties. It is a further object of this invention to introduce polar groups into the composition so as to improve properties such as adhesion of the composition to polar substrates. Other objects will become apparent during the following detailed description of the invention.

STATEMENT OF THE INVENTIONS

Now, in accordance with the present invention, compositions are provided comprising 100 parts by weight of a block copolymer having at least two polymer blocks A and at least one polymer block B, each polymer block A being selected from the group consisting of monoalkenyl arene polymers and hydrogenated derivatives thereof wherein no more than about 25% of the arene double bonds have been reduced, and polymer block B being polymer of a $C_{4-5}$ conjugated diene wherein at least about 80% of the aliphatic unsaturation has been reduced by hydrogenation subsequent to polymerization; and 5–95 parts by weight of an ABS type polymer. It has been found that blends of these two types of polymers exhibit substantially improved processability, and high tensile strength as compared with the unblended block copolymer.

The block copolymers with which this invention is concerned may have a variety of geometrical structures, since the invention does not depend on any specific geometrical structure, but rather upon the chemical constitution of each of the polymer blocks. Thus, the structures may be linear or branched as long as each molecule has at least two polymer blocks A and at least one polymer block B as defined above. Methods for the preparation of such polymers are known in the art. Particular reference will be made to the use of lithium-based catalysts and especially lithium-alkyls for the preparation of the precursor polymers. U.S. Pat. No. 3,595,942 describes the polymers and suitable methods for their hydrogenation.

The structure of the polymers is determined by their methods of polymerization. For example, linear polymers result by sequential introduction of the desired monomers into the reaction vessel when using such initiators as lithium-alkyls or dilithiostilbene and the like, or by coupling an intermediate polymer with a difunctional coupling agent. Branched structures, on the other hand, may be obtained by the use of suitable coupling agents having a functionality with respect to the precursor polymers of three or more. Coupling may be effected with difunctional coupling agents such as dihalo-alkanes or -alkenes, as well as certain multifunctional polar compounds such as silicon halides, siloxanes or esters of monohydric alcohols with dicarboxylic acids. The presence of any coupling residues in the polymer may be ignored for an adequate description fo the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene
polystyrene-polyisoprene-polystyrene
poly(alpha methyl styrene)-polybutadiene-poly(alpha methyl styrene) and
poly(alpha methyl styrene)-polyisoprene-poly(alpha methyl styrene)

It will be understood that both blocks A and B may be either homopolymer or random copolymer blocks as long as each block predominates in at least one species of the monomers characterizing the blocks as defined hereinbefore. Thus, blocks A may comprise styrene/alpha methyl styrene copolymer blocks or styrene/butadiene random copolymer blocks as long as the blocks individually predominate in monoalkenyl arenes. The term "monoalkenyl arene" will be taken to include especially styrene and its analogs and homologs including alpha methyl styrene and ring-substituted styrenes, particularly ring methylated styrenes. The blocks B may comprise homopolymers of butadiene or isoprene, copolymers of butadiene with isoprene and copolymers of one of these two dienes with a monoalkenyl arene as long as the blocks B predominate the conjugated diene units.

Hydrogenation of the precursor block copolymers is preferably effected by use of catalysts comprising the reaction products of an aluminum alkyl compound with nickel or cobalt carboxylates or alkoxides under such conditions as to substantially completely hydrogenate at least 80% of the aliphatic double bonds and hydrogenating no more than about 25% of the alkenyl arene aromatic double bonds.

The average molecular weights of the the individual blocks is not a critical aspect of the present invention. In most instances, however, the monoalkenyl arene blocks will have number average molecular weights in the order of 2,000–50,000, while the conjugated diene blocks either before or after hydrogenation will have average molecular weights in the order of 20,000–300,000. These molecular weights are most accurately determined by tritium counting methods or osmotic pressure measurements.

The ABS type polymers may be random, block or graft copolymers and related products generally referred to as "interpolymers," which are preferred. The polymers generally comprise particularly an interpolymer comprising 5–60 wt % of a diene rubber, 5–50 wt % of an acrylic monomer, and 25–85 wt % of an alkenyl aromatic monomer. The means for formation of ABS type polymers are well known and described in such patents as the following: U.S. Pat. Nos. 3,422,979, 3,422,980, 3,422,981, 3,444,271 and 3,488,175. A preferred range of ABS polymers is as follows:

|  | % by weight |
|---|---|
| Polybutadiene | 10–55 |
| Acrylonitrile | 7.5–35 |
| Styrene | 30–70 |

Examples of alkenyl aromatic monomers for use in producing ABS-type polymers include alkenyl aromatic hydrocarbons containing 8–20 carbon atoms and their halogenated derivatives such as styrene, alpha-alkyl styrenes, wherein the alkyl groups contain 1–8 carbon atoms such as alpha-methyl styrene, alpha-chloro styrene, vinyl napthththalene, alkyl substituted vinyl napththalene, wherein the alkyl groups contain 1–8 carbon atoms, and halogen-substituted vinyl naphthalene. In most instances, styrene is preferred, The acrylic monomers for use in producing ABS-type polymers have the general formula

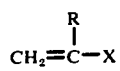

wherein R is selected from the group consisting of hydrogen and alkyl groups having 1–5 carbon atoms, and X is selected from the group consisting of

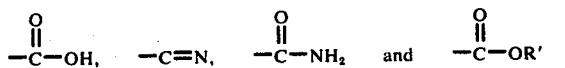

wherein R' is an alkyl group containing 1–5 carbon atoms. Examples of specific acrylic monomers include acrylonitrile, acrylamide, methyl or ethyl acrylonitrile, and acrylic, methacrylic and ethacrylic acids and the methyl, ethyl, propyl and isopropyl esters thereof. Acrylonitrile is usually preferred.

Examples of conjugated polyunsaturated monomers for use in producing ABS-type polymers include polyenes containing 4–10 carbon atoms and at least one pair of conjugated ethylenic double bonds, and the halogenated derivatives thereof; specific examples include 1,3-butadiene, isoprene, piperylene, 1,3-dimethylbutadiene, and chloroprene. Butadiene is usually preferred.

The conjugated polyunsaturated monomers may be preformed into polymers of any desired average molecular weight, from about 1000 to about 2,000,000. In addition to homopolymers of conjugated dienes, random or block copolymers of conjugated dienes with other co-polymerizable monomers such as monoalkenyl arenes may be employed. Block copolymers of conjugated dienes with monovinyl arenes are of specific interest in the formation of ABS type polymers having maximum compatibility with the block copolymers with which the ABS polymer is blended. The block copolymers useful for this purpose may be either linear or branched, depending on their known methods of polymerization and/or coupling which is often used in the formation of block copolymers as referred to hereinbefore.

EXAMPLE I

Compositions were prepared comprising 100 parts by weight of a selectively hydrogenated block copolymer having the structure polystyrene-hydrogenated polybutadiene-polystyrene wherein the block molecular weights were 10,000–50,000–10,000. This polymer was blended with 50 parts by weight of an ABS polymer with the following weight composition:

| Polybutadiene | 54.3% |
|---|---|
| Styrene | 38.0% |
| Acrylonitrile | 7.7% | resulting in a composition having substantially improved processability as judged by behavior of the melted compound in milling and molding operation. The composition had the following properties:

|  | Blend | Block Copolymer |
|---|---|---|
| Tensile strength at break, psi | 5050 | 6400 |
| Elongation at break, % | 320 | 590 |
| 30% Modulus, psi | 5000 | 290 |
| Set at Break, % | 50 | 25 |
| Processability (Mixing on 3" mill at 195–215°C) | Fair | Poor |

I claim as my invention:
1. A composition comprising
   a. 100 parts by weight of a block copolymer having at least two polymer blocks A and at least one polymer block B, each polymer block A being selected from the group consisting of monoalkenyl arene polymers and hydrogenated products thereof wherein no more than about 25% of the aromatic double bonds having been reduced, and polymer block B being a hydrogenated polymer block of a $C_{4-5}$ conjugated diene wherein at least about 80% of the aliphatic unsaturation of the block has been reduced by hydrogenation; and
   b. 5–90 parts by weight of an interpolymer of

| | % by Weight |
|---|---|
| Diene rubber | 5–60 |
| Acrylonitrile | 5–50 |
| Alkenyl aromatic monomer | 25–85. |

2. A composition according to claim 1 wherein, prior to hydrogenation, the block copolymer has a structure polystyrene-polybutadiene-polystyrene.

3. A composition according to claim 1 wherein the interpolymer comprises

| | % by Weight |
|---|---|
| Polybutadiene | 10–35 |
| Acrylonitrile | 7.5–35 |
| Styrene | 30–70. |

4. A composition according to claim 1 wherein the composition comprises 10–75 parts by weight of interpolymer.

5. A composition according to claim 1 wherein the diene rubber component of the interpolymer is a block copolymer of styrene and butadiene.

* * * * *